US010527307B2

(12) United States Patent
Saffre et al.

(10) Patent No.: US 10,527,307 B2
(45) Date of Patent: Jan. 7, 2020

(54) METHODS AND SYSTEMS FOR CONTROLLING APPLIANCES

(71) Applicants: Khalifa University of Science, Technology, and Research, Abu Dhabi (AE); British Telecommunications plc, London (AE); Emirates Telecommunications Corporation, Abu Dhabi (AE)

(72) Inventors: Fabrice Saffre, Abu Dhabi (AE); Kin Poon, Abu Dhabi (AE); Dymitr Ruta, Abu Dhabi (AE)

(73) Assignees: Khalifa University of Science and Technology, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 95 days.

(21) Appl. No.: 15/841,463

(22) Filed: Dec. 14, 2017

(65) Prior Publication Data

US 2019/0186770 A1   Jun. 20, 2019

(51) Int. Cl.
*F24F 11/30* (2018.01)
*F24F 11/56* (2018.01)
(Continued)

(52) U.S. Cl.
CPC .............. *F24F 11/62* (2018.01); *F24F 11/30* (2018.01); *F24F 11/56* (2018.01); *F24F 11/61* (2018.01);
(Continued)

(58) Field of Classification Search
CPC .. F24F 11/30; F24F 11/54; F24F 11/56; F24F 11/49; G05B 2219/2642; G05B 2219/2638; G05B 2219/2614; G05B 2219/23297
(Continued)

(56) References Cited

U.S. PATENT DOCUMENTS

| 7,676,280 B1 | 3/2010 | Bash et al. |
| 8,160,729 B2 | 4/2012 | Ahmed |

(Continued)

FOREIGN PATENT DOCUMENTS

EP   3156858 A1   4/2017

OTHER PUBLICATIONS

Farrokh Jazizadeh, Burcin Becerik-Gerber "Toward Adaptive Comfort Management in Office Buildings Using Participatory Sensing for End User Driven Control", 4th ACM Workshopt on Embedded Sensing System for Energy-Efficiency in Buildings, Nov. 6, 2012, Toronto Canada.

(Continued)

*Primary Examiner* — Michael J Brown
(74) *Attorney, Agent, or Firm* — Calfee, Halter & Griswold, LLP

(57) ABSTRACT

This invention relates to methods and systems for controlling appliances, particularly climate control appliances such as air conditioning units used in buildings. Embodiments of the invention provide methods and systems which provide a framework of semi-autonomous sensors and actuators which can achieve climate control without the need for centralised or explicit coordination. In certain embodiments, the climate control system is capable of identifying suitable pairings of sensors and actuators and taking into account actions of other actuators. The embodiments have particular application in buildings where large numbers of individual sensors (Continued)

and actuators are deployed in an ad-hoc or unplanned manner over time, but can communicate with each other. The embodiments of the invention can provide improved efficiency, reduced infrastructure costs, improved flexibility and can be deployed across multiple sites.

28 Claims, 4 Drawing Sheets

(51) Int. Cl.
    *F24F 11/61*     (2018.01)
    *G05B 15/02*     (2006.01)
    *F24F 11/62*     (2018.01)
    *F24F 11/88*     (2018.01)
    *F24F 11/64*     (2018.01)
    *G06F 17/18*     (2006.01)
    *G05B 13/02*     (2006.01)
    *F24F 11/65*     (2018.01)
    *F24F 11/54*     (2018.01)
    *F24F 11/46*     (2018.01)
    *F24F 11/49*     (2018.01)
    *F24F 11/58*     (2018.01)
    *F24F 140/40*     (2018.01)
    *F24F 110/10*     (2018.01)
    *F24F 140/00*     (2018.01)
(52) U.S. Cl.
    CPC .............. *F24F 11/64* (2018.01); *F24F 11/65* (2018.01); *F24F 11/88* (2018.01); *G05B 13/0265* (2013.01); *G05B 15/02* (2013.01); *G06F 17/18* (2013.01); *F24F 2110/10* (2018.01); *F24F 2140/00* (2018.01); *F24F 2140/40* (2018.01)

(58) Field of Classification Search
    USPC ........................................ 700/278, 276, 277
    See application file for complete search history.

(56) References Cited

U.S. PATENT DOCUMENTS

| | | | |
|---|---|---|---|
| 9,020,647 | B2 | 4/2015 | Johnson et al. |
| 2003/0228035 | A1 | 12/2003 | Parunak et al. |
| 2007/0219645 | A1 | 9/2007 | Thomas et al. |
| 2010/0324962 | A1 | 12/2010 | Nesler et al. |
| 2011/0178977 | A1 | 7/2011 | Drees |
| 2013/0013122 | A1* | 1/2013 | Dyess ............... F24F 11/30 700/295 |
| 2016/0265798 | A1* | 9/2016 | Havard, Jr. ............ F25B 49/00 |

OTHER PUBLICATIONS

Giancarlo Fortino and Antonio Guerrieri, "Decentralized and Embedded Management for Smart Buildings", in the Proceeding of the Workshop on Applications of Software Agents ISBN 978-86-7031-188-6, pp. 3-7, 2011.
Giancarlo Fortino, Antonio Guerrieri, "Monitoring building indoors through clustered embedded agents", in Computer Science and Information Systems (FedCSIS), 2011 Federated Conference on , vol., no., pp. 569-576, Sep. 18-21, 2011.
International Search Report dated Dec. 14, 2017 on PCT/EP2017/082907.

* cited by examiner

METHODS AND SYSTEMS FOR CONTROLLING APPLIANCES

FIELD OF THE INVENTION

The present invention relates to methods and systems for controlling appliances. It is particularly, but not exclusively, concerned with methods and system for controlling climate control appliances such as air conditioning units used in buildings.

BACKGROUND OF THE INVENTION

A Building Management System or "BMS" is traditionally used to orchestrate the operation of the climate control infrastructure (which may include sensors, A/C vents, chillers etc.) in large buildings. It is essentially a control centre that takes inputs from sensors and is programmed to activate various appliances in response to the value of certain variables (such as temperature, humidity, etc.) deviating from a target set-point, in accordance with a predefined policy. This policy can be designed to maximise comfort, minimise cost or, as is usually the case, achieve a suitable compromise between both objectives.

However, conventional BMS suffer from a number of potential problems.

One issue is the poor placement of sensors or, more specifically, a poor mapping between sensors and actuators. For instance, an A/C vent may be opened in response to a temperature reading from a sensor that is not located in its optimal area of influence. The result could be that the air-conditioning system brings the temperature down to uncomfortable levels in one zone while attempting to lower it in another (where the sensor is located). Conversely, at other times, the system could let the temperature drift too high above the set-point in its area of influence because the sensor reading (from another location) mistakenly indicates that it is within tolerance limits. Note that this pathological behaviour does not result from an easily identifiable fault in the system but from poor planning, or perhaps post-installation modification of the building or the system which can be much harder to detect or remedy.

Another, closely related, problem with similar consequences presents itself when the sensor is suitably located with respect to the climate control appliance it triggers, but near an independent source that is not controlled (or monitored) by the BMS (for example a heat or cold source, but also a source of humidity such as a kettle. A typical example is a temperature sensor located downstream from a server ventilation system, which can lead to the ambient temperature in the room being consistently and severely overestimated.

Another area for potential improvement is flexibility. Because it is centrally controlled, informed by a fixed set of sensors and triggered at arbitrary set-points, a conventional BMS usually does not take into account individual preferences. This means that the temperature can be maintained, sometimes at considerable cost, above or below what the occupants of a particular zone actually find comfortable, which is obviously wasteful.

Finally and more generally, centralised BMSs are an aging technology that embodies a "command and control" approach to the management of a large but static climate control infrastructure that is expected to remain in use and virtually unchanged for decades. As a result, conventional BMS design is simply unfit to deal with the unpredictable and dynamic "proliferation" of a wide range of sensors and smart appliances that will develop in the Internet of Things (IoT) environment.

Jazizadeh et al. [1] describes approaches to facilitate the communication between humans and buildings toward adaptive end-user comfort management and, specifically, how occupants communicate their comfort preferences to the building management systems. An interaction framework is set out in the paper to enable occupants to control the systems to meet their comfort requirements whilst reducing energy consumption. The human building interaction (HBI) framework described employs a participatory sensing approach to improve comfort level, energy awareness and learning in commercial buildings. Both mobile and web-based applications were provided to capture participants' comfort levels in terms of temperature, light intensity and air flow. The collected data was then analyzed and compared with the actual sensor readings in an attempt to meet occupant preferences and reduce energy consumption.

The system described is based on the interaction between humans and buildings to achieve energy reduction and improve comfort levels.

Fortino and Guerrieri [2], [3] propose an agent-based architecture to decentralize the sensing and actuation operations of a BMS. It was achieved through distributed cooperative agents embedded in sensor/actuator devices and coordinators such as PCs, PDA and smartphones. The communication between different types of agents is either peer-to-peer or master/slave dependent on which type of agent is interacted with which. The system was deployed in a computer laboratory where the sensing devices were used to collect the information about ambient light, user presence and electricity consumed by the workstations. The collected information was analyzed to monitor the space occupancy and the pattern of energy consumption.

Although both papers provide a decentralized approach to monitor the power usage, the exact sensor positions need to be defined in advance which is not conducive to a system which can adapt to the addition or removal of sensors.

US 2011/0178977 A1 describes a method of analysing faults in a building management system. The method detects a fault in the building management system by evaluating data from the building management system using a system of rules. It then determines the most likely cause of fault by comparing the determined probabilities of previously identified faults based on the application of the Bayes' theorem and reports the most likely fault electronically. Although this system is designed to improve building efficiency and provide more comfortable and productive buildings, the main focus is on fault identification by standard machine learning means.

U.S. Pat. No. 8,600,556 B2 provides a very detailed description of a smart building manager which aims to improve building efficiency. The building manager consists of many layers such as communications and integrated control layer, demand response layer and building subsystem integration layer to collect and process information, and determine the outputs. A fault detection and diagnostics layer is also included in the building manager to detect and diagnose faults based on statistical analysis, rule-based analysis, and model-based analysis.

This smart building manager is based on a centralised approach to collect and process information. It is therefore not suitable for a distributed system.

U.S. Pat. No. 7,567,844 B2 describes a building management system which can handle one or more buildings which may be located at different places in the world. The system provides a 3 dimensional or 3-dimensional render in 2 dimensional model of the building being monitored. A variety of building management or control devices including sensors, actuators, chillers, steam plants, security systems, smoke detectors, and lighting systems are employed to monitor and control the subject building by a central building controller. In addition, the actual locations and status of the sensors and control devices, treated as points of interest, can be mapped on the virtual model of the building. Information related to the building or buildings can be recorded and played back as needed for analysis.

The main focus of the above patent is a method for presenting a 3 dimensional model of a building with the data and locations of control devices mapped to the model. Thus it provides a human manager of the building with an opportunity to identify problematic areas showing inefficient resource consumption, but requires human input to deal with those problems.

An object of the present invention is to provide a climate control system and a control method which are able to adjust relationships between sensors and climate control devices.

A further object of the present invention is to provide a climate control system and a control method which can take account of sensors which provide inaccurate feedback.

A further object of the present invention is to provide a climate control system and a control method which is flexible to individual preferences.

A further object of the present invention is to provide a climate control system and a control method which is flexible to the addition and/or removal and/or relocation of sensors and climate control devices.

SUMMARY OF THE INVENTION

An exemplary embodiment of the invention provides a method of controlling a climate control device whose operation affects a climate parameter, the method including the steps of: detecting the value of the climate parameter at a plurality of sensors remote from said climate control device; receiving the detected values from a plurality of said sensors at the climate control device; analysing, at said climate control device, the received values and determining a subset of said sensors as being sensors which are influenced by the operation of the climate control device: and subsequently controlling the operation of the climate control device in accordance with further received values from said subset of sensors.

A further exemplary embodiment of the invention provides a climate control system, the system including: a climate control device whose operation affects a climate parameter, the climate control device having a controller; and a plurality of sensors configured to detect the value of the climate parameter, wherein the controller is configured to control the operation of the climate control device by: receiving the detected values from a plurality of said sensors; analysing the received values and determining a subset of said sensors as being sensors which are influenced by the operation of the climate control device: and subsequently controlling the operation of the climate control device in accordance with further received values from said subset of sensors.

BRIEF DESCRIPTION OF THE DRAWINGS

Embodiments of the invention will now be described by way of example with reference to the accompanying drawings in which.

DETAILED DESCRIPTION

Figure 1:
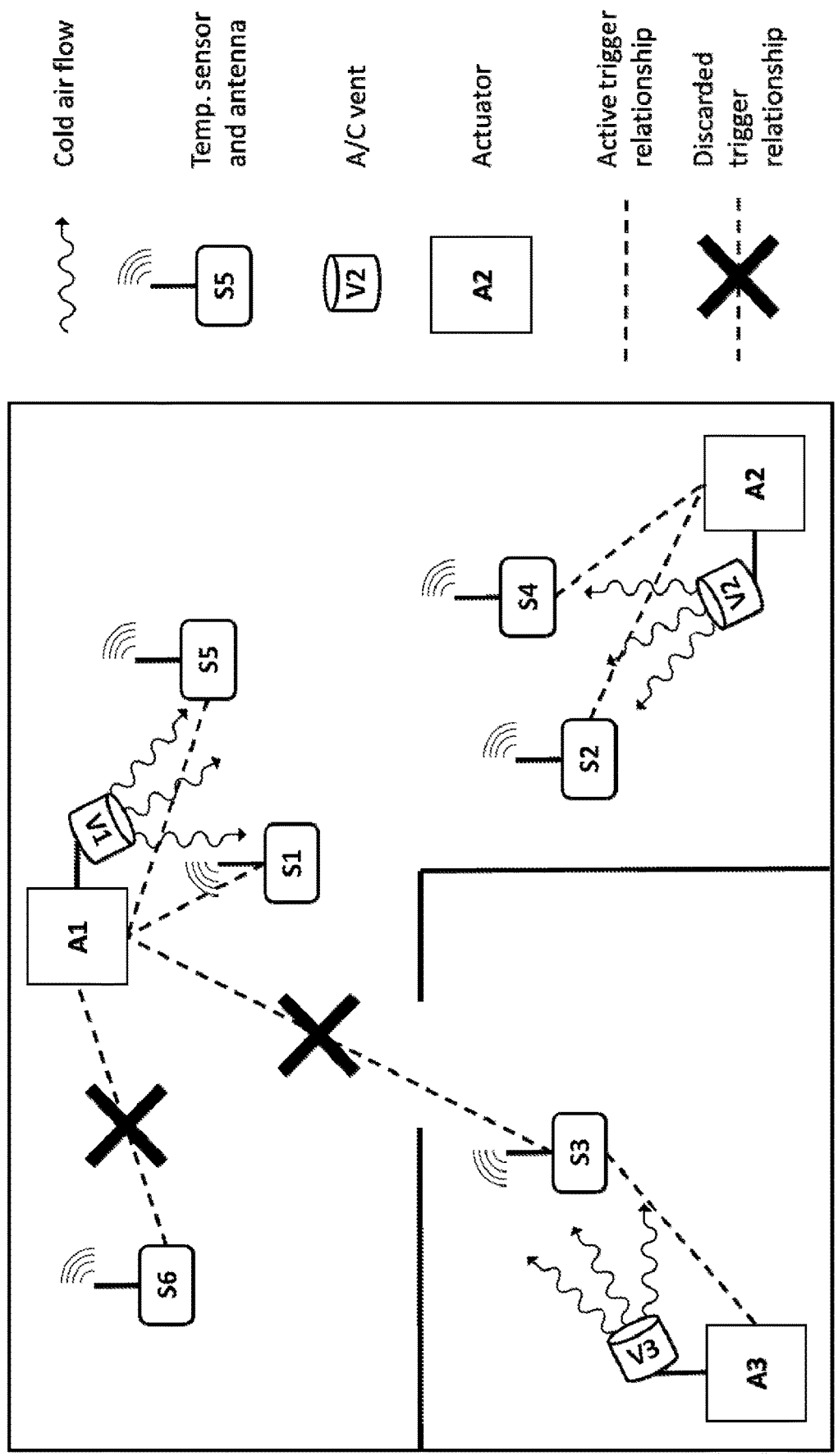
FIG. 1 shows an outline of a building management system according to an embodiment of the present invention.

At their broadest, methods of the present invention provide for methods of controlling a climate control device by determining a subset of available sensors which are influenced by the climate control device and controlling the climate control device based on information from those sensors.

A first aspect of the present invention provides a method of controlling a climate control device whose operation affects a climate parameter, the method including the steps of: detecting the value of the climate parameter at a plurality of sensors remote from said climate control device; receiving the detected values from a plurality of said sensors at the climate control device; analysing, at said climate control device, the received values and determining a subset of said sensors as being sensors which are influenced by the operation of the climate control device: and subsequently controlling the operation of the climate control device in accordance with further received values from said subset of sensors.

The method of this aspect can operate in an "intelligent" framework that involves co-operation between sensors and semi-autonomous actuators (but, not necessarily among the sensors).

The method can be arranged to progressively identifying suitable pairings of climate control devices and sensors, for example through unsupervised machine learning, and implementing a self-defining policy capable of taking into account individual preferences (if specified).

The method of this aspect can provide a framework for choreographing the action of a collection of semi-autonomous sensors and actuators to achieve climate control. In particular it may do so without the need for centralised and explicit coordination via a dedicated BMS.

The method of the present aspect is particularly useful in controlling the heating or cooling of a building in a context (particularly likely to arise with the proliferation of Internet of Things in connected devices) where large numbers of individual sensors (e.g. thermometers) and actuators (e.g. air-conditioning appliances) may be deployed in an ad-hoc, unplanned fashion over a period of time, but are fitted with communication and decision-making capabilities making them "intelligent". The method of the present aspect can provide a process for efficient control in such situations.

Compared to a conventional BMS a method according to the present aspect may provide for improved efficiency, reduced infrastructure costs (no dedicated control centre), the ability to seamlessly deploy across multiple sites (as opposed to a single building) and/or improved flexibility (e.g. through adaptive self-reconfiguration in the presence of dynamic and/or variable set-points).

Preferably the method further includes the step of recording a time-series of values from said sensors over a predetermined time window, wherein the step of analysing includes comparing said time-series to the operation of the climate control device in the same window. The use of time-series data allows comparison between the time of operation of the device and the (apparent) effect on the sensor values. Preferably the time-series data is based on the time since the start of operation of the climate control device, which can allow statistical data to be produced for each sensor once multiple values have been obtained.

Preferably the method further includes the step of receiving, at the climate control device, information from at least one other climate control device regarding its operation, and wherein the step of analysing takes account of that information. Knowing information about the operation of other devices can allow the climate control device to determine which sensors may also be affected by the operation of other devices.

Preferably the step of analysing determines the subset of sensors as the sensors which are most influenced by the operation of the climate control device. This may be done by determining a ranking of the sensors and/or by excluding from potential consideration any sensors whose detected values are inconsistent with the operation of the climate control device.

In particular embodiments, the step of analysing orders the sensors from which detected values are received using the composite variable α:

$$\alpha = \frac{\delta T_{min}}{\overline{s'}}$$

wherein $\delta T_{min}$ and $\overline{s'}$ are calculated as follows, based on $\overline{\delta T_i}$ being the temperature variation between the reading at time i (since activation) and its predecessor, averaged over the n values recorded during the latest period, and $\overline{s'}$ is the weighted standard deviation averaged over all r elements of the time series:

$$\overline{\delta T_t} = \frac{\sum_{j=1}^{n} \delta T_{i,j}}{n}$$

$$s_i = \sqrt{\frac{\sum_{j=1}^{n} (\delta T_{i,j} = \overline{\delta T_i})^2}{n-1}}$$

$$s'_i = \frac{s_i}{|\overline{\delta T_i}|}$$

$$\overline{s'} = \frac{\sum_{i=1}^{r} s'_i}{r}$$

$$\delta T_{min} = \min(\overline{\delta T_1}, \overline{\delta T_2}, \ldots, \overline{\delta T_r})$$

and determines said subset as the sensors with the lower values of α amongst the sensors from which detected values are received. The composite value alpha is designed so that the sensors on which the climate control device has the strongest influence come first in the list, unless the data is noisy.

The subset may then be determined as all sensors having a value of α below a predetermined level. Alternatively, the subset may be determined as a predetermined number of sensors having the lowest values of α.

In particular embodiments, the operation of the device causes the climate parameter in an area immediately surrounding the device to change in a first direction (e.g. causing temperature to decrease in the example of an air conditioning unit), and the method further includes the step of recording a time-series of data from each of said sensors over a predetermined time window during which the device is operational, and the step of analysis includes the sub-steps of: determining, for each time-series, the change in each recorded value compared to the last recorded value from same sensor, determining, from said changes, the sensors whose changes in recorded values in said window change from being changes in a second direction, which is opposite to said first direction (e.g. increasing temperature in the example of an air conditioning unit), to being changes in the first direction (e.g. decreasing temperature in the example of an air conditioning unit), and whose changes in recorded values in said window do not change from being changes in said first direction to changes in said second direction in said window; and selecting only said determined sensors in said subset.

In such an embodiment the subset of sensors includes the sensors whose changes in recorded values in said window change from being changes in a second direction. This change suggest that the climate control device has an influence on the climate parameter in the vicinity of the sensor. However, sensors whose changes in recorded values in said window change from being changes in said first direction to changes in said second direction in said window this is an inverse of the expected effect and is contradictory to the hypothesis of the climate parameter in the vicinity of the sensor being influenced by the climate control device.

Further refinement of the selection of sensors in such embodiments may also be employed, for example by selecting only sensors ranked above the first sensor which does not satisfy these criteria, unless none are eligible in which case the first ranked sensor is selected as the sole member of the subset.

Preferably at least one of the sensors has a predetermined target value for the climate parameter and the detected values from said sensor or sensors are in the form of differences between the measured and target values of the climate parameter at said sensor. The predetermined target value may be set by the occupant(s) of the area around the sensor and therefore user preferences can be fed into the control method.

In some embodiments, when the climate control device is first switched on, its operation is initially controlled based on the detected values from an arbitrary subset of said sensors, until sufficient detected values have been received for said analysis step to be performed. Selection of an arbitrary subset of sensors in this manner provides a "baseline" for the operation of the device in order to "bootstrap" the learning process. It is very unlikely that the arbitrarily-selected subset will be ideal for the operation of the climate control device, but it is likely to quickly become evident through the learning process which sensors should and should not form part of the subset.

In certain embodiments the step of controlling may further cause the device to remain in an inactive state at least for a determined period after the device is caused to be inactive, regardless of said received values during said determined period. This can prevent situations in which the climate control device alternates too quickly between "on" and "off" states or remains constantly stuck in one state. The determined period may be randomly selected as any duration between zero and the length of the previous activation of the device.

In certain embodiments, the climate control device maintains a list of sensors which are candidates for inclusion in said subset, wherein the plurality of sensors from which the detected values are received are the sensors on said list, and further including the steps of adding and/or removing sensors from said list based on determinations as to the potential relevance of the sensor to the operation of the climate control device.

For example, if the rate of change of the climate parameter detected by a sensor reaches a predetermined level, the identity of that sensor may be communicated to all climate control devices which are currently active, and the receipt of such a communication may cause any climate control device which is currently active to add that sensor to its list of sensors.

The method may further include the step of, if the rate of change of the climate parameter detected by a sensor reaches a predetermined level, communicating the identity of that sensor to all climate control devices which are currently active. This allows a sensor which may not be in the subset of sensors of the active climate control devices to communicate to those devices that it appears to be affected by the operation of at least one of those devices and so should be considered for future selection.

In certain embodiments the method further includes the steps of: communicating, between the climate control devices, whether each climate control device is active or not; for a first climate control device among said climate control devices, determining which of the other climate control devices has the greatest overlap in activity; and during the step of 3D subsequently controlling, determining whether the other climate control device with the greatest overlap in activity is active or not, and, if said other climate control device is active, not activating said first climate control device for a predetermined period of time.

Such embodiments provide for a disambiguation process to potentially avoid the situation where a climate control device incorrectly determines that it is having an influence on a particular sensor. This might arise, for example, if another climate control device has very similar operating patterns and is responsible for the effect on the sensor in question. By deliberately avoiding operating overlap between climate control devices which have previously had a high degree of overlap, such errors can be reduced or prevented.

The method of the present aspect may include any combination of some, all or none of the above described preferred and optional features.

The method of the above aspect is preferably implemented by a system according to the second aspect of this invention, as described below, but need not be.

Further aspects of the present invention include computer programs for running on computer systems which carry out the method of the above aspect, including some, all or none of the preferred and optional features of that aspect.

At their broadest, systems of the present invention provide climate control systems in which a climate control device is controlled by determining a subset of available sensors which are influenced by the climate control device and controlling the climate control device based on information from those sensors.

A second aspect of the present invention provides a climate control system, the system including: a climate control device whose operation affects a climate parameter, the climate control device having a controller; and a plurality of sensors configured to detect the value of the climate parameter, wherein the controller is configured to control the operation of the climate control device by: receiving the detected values from a plurality of said sensors; analysing the received values and determining a subset of said sensors as being sensors which are influenced by the operation of the climate control device: and subsequently controlling the operation of the climate control device in accordance with further received values from said subset of sensors.

The system of this aspect can operate in an "intelligent" framework that involves co-operation between sensors and semi-autonomous actuators (but, not necessarily among the sensors).

The system can be arranged to progressively identifying suitable pairings of climate control devices and sensors, for example through unsupervised machine learning, and implementing a self-defining policy capable of taking into account individual preferences (if specified).

The system of this aspect can provide a framework in which the action of a collection of semi-autonomous sensors and actuators is choreographed to achieve climate control. In particular the system may do so without the need for centralised and explicit coordination via a dedicated BMS.

The system of the present aspect is particularly useful for controlling the heating or cooling of a building in a context (particularly likely to arise with the proliferation of Internet of Things connected devices) where large numbers of individual sensors (e.g. thermometers) and actuators (e.g. air-conditioning appliances) may be deployed in an ad-hoc, unplanned fashion over a period of time, but are fitted with communication and decision-making capabilities making them "intelligent". The system of the present aspect can provide a process for efficient control in such situations.

Compared to a conventional BMS a system according to the present aspect may provide for improved efficiency, reduced infrastructure costs (no dedicated control centre), the ability to seamlessly deploy across multiple sites (as opposed to a single building) and/or improved flexibility (e.g. through adaptive self-reconfiguration in the presence of dynamic and/or variable set-points).

Preferably the sensor and/or the controller are configured to record a time-series of values from said sensors over a predetermined time window, and the controller is further configured to analyse the received values by comparing said time-series to the operation of the climate control device in the same window. The use of time-series data allows comparison between the time of operation of the device and the (apparent) effect on the sensor values. Preferably the time-series data is based on the time since the start of operation of the climate control device, which can allow statistical data to be produced for each sensor once multiple values have been obtained.

Preferably the controller is further configured to receive information from at least one other climate control device regarding its operation, and to take account of that information when analysing the received values. Knowing information about the operation of other devices can allow the climate control device to determine which sensors may also be affected by the operation of other devices.

Preferably the controller is further configured to determine the subset of sensors as the sensors which are most influenced by the operation of the climate control device. This may be done by determining a ranking of the sensors and/or by excluding from potential consideration any sensors whose detected values are inconsistent with the operation of the climate control device.

In particular embodiments the controller is configured to analyse the received values by orders the sensors from which detected values are received using the composite variable α:

$$\alpha = \frac{\delta T_{min}}{\overline{s'}}$$

wherein $\delta T_{min}$ and $\overline{s'}$ are calculated as follows, based on $\overline{\delta T_i}$ being the temperature variation between the reading at time i (since activation) and its predecessor, averaged over the n values recorded during the latest period, and $\overline{s'}$ is the weighted standard deviation averaged over all r elements of the time series:

$$\overline{\delta T_i} = \frac{\sum_{j=1}^{n} \delta T_{i,j}}{n}$$

$$s_i = \sqrt{\frac{\sum_{j=1}^{n} (\delta T_{i,j} = \overline{\delta T_i})^2}{n-1}}$$

$$s'_i = \frac{s_i}{|\overline{\delta T_i}|}$$

$$\overline{s'} = \frac{\sum_{i=1}^{r} s'_i}{r}$$

$$\delta T_{min} = \min(\overline{\delta T_1}, \overline{\delta T_2}, \ldots, \overline{\delta T_r})$$

and to determine said subset as the sensors with the lower values of α amongst the sensors from which detected values are received. The composite value alpha is designed so that the sensors on which the climate control device has the strongest influence come first in the list, unless the data is noisy.

The controller may be configured to determine the subset as all sensors having a value of α below a predetermined level. Alternatively the controller may be configured to determine the subset as a predetermined number of sensors having the lowest values of α.

In particular embodiments the operation of the device causes the climate parameter in an area immediately surrounding the device to change in a first direction (e.g. the temperature to decrease in the example of an air conditioning unit), and further wherein: the controller is configured to record or receive a time-series of data from each of said sensors over a predetermined time window during which the device is operational, and wherein the controller is further configured to analyse the received values by: determining, for each time-series, the change in each recorded value compared to the last recorded value from same sensor, determining, from said changes, the sensors whose changes in recorded values in said window change from being changes in a second direction, which is opposite to said first direction (e.g. increasing temperature in the example of an air conditioning unit), to being changes in the first direction (e.g. decreasing temperature in the example of an air conditioning unit), and whose changes in recorded values in said window do not change from being changes in said first direction to changes in said second direction in said window; and selecting only said determined sensors in said subset.

In such an embodiment the subset of sensors includes the sensors whose changes in recorded values in said window change from being changes in a second direction. This change suggest that the climate control device has an influence on the climate parameter in the vicinity of the sensor. However, sensors whose changes in recorded values in said window change from being changes in said first direction to changes in said second direction in said window this is an inverse of the expected effect and is contradictory to the hypothesis of the climate parameter in the vicinity of the sensor being influenced by the climate control device.

Further refinement of the selection of sensors in such embodiments may also be employed, for example by selecting only sensors ranked above the first sensor which does not satisfy these criteria, unless none are eligible in which case the first ranked sensor is selected as the sole member of the subset.

Preferably at least one of the sensors has a predetermined target value for the climate parameter and the detected values from said sensor or sensors are in the form of differences between the measured and target values of the climate parameter at said sensor. The predetermined target value may be set by the occupant(s) of the area around the sensor and therefore user preferences can be fed into the system.

In some embodiments, the controller is configured such that, when climate control device is first switched on, its operation is initially controlled based on the detected values from an arbitrary subset of said sensors, until sufficient detected values have been received for said analysis step to be performed. Selection of an arbitrary subset of sensors in this manner provides a "baseline" for the operation of the device in order to "bootstrap" the learning process. It is very unlikely that the arbitrarily-selected subset will be ideal for the operation of the climate control device, but it is likely to quickly become evident through the learning process which sensors should and should not form part of the subset.

In certain embodiments the controller may be configured to cause the device to remain in an inactive state at least for a determined period after the device is caused to be inactive, regardless of said received values during said determined period. This can prevent situations in which the climate control device alternates too quickly between "on" and "off" states or remains constantly stuck in one state. The determined period is randomly selected as any duration between zero and the length of the previous activation of the device.

In certain embodiments the controller is configured to maintain a list of sensors which are candidates for inclusion in said subset, wherein the plurality of sensors from which the detected values are received are the sensors on said list, and wherein the controller is further configured to add and/or remove sensors from said list based on determinations as to the potential relevance of the sensor to the operation of the climate control device.

For example, the sensors may be configured to, if the rate of change of the climate parameter detected by a sensor reaches a predetermined level, communicate the identity of that sensor to all climate control devices which are currently active and the controller may be further configured to, on receipt of such a communication, if said climate control device is currently active, add that sensor to its list of sensors.

In certain embodiments, the sensors may be configured to, if the rate of change of the climate parameter detected by a sensor reaches a predetermined level, communicate the identity of that sensor to all climate control devices which are currently active. This allows a sensor which may not be in the subset of sensors of the active climate control devices to communicate to those devices that it appears to be affected by the operation of at least one of those devices and so should be considered for future selection.

In certain embodiments there are a plurality of climate control device and each climate control device may be configured to communicate to other climate control devices, whether said climate control device is active or not; the controller of a first climate control device among said climate control devices may be configured to: determine which of the other climate control devices has the greatest overlap in activity with said first climate control device; and when subsequently controlling the operation of the first climate control device, determine whether the other climate control device with the greatest overlap in activity is active or not, and, if said other climate control device is active, not activate said first climate control device for a predetermined period of time.

Such embodiments provide for a disambiguation process to potentially avoid the situation where a climate control device incorrectly determines that it is having an influence on a particular sensor. This might arise, for example, if another climate control device has very similar operating patterns and is responsible for the effect on the sensor in question. By deliberately avoiding operating overlap between climate control devices which have previously had a high degree of overlap, such errors can be reduced or prevented.

The system of the present aspect may include any combination of some, all or none of the above described preferred and optional features.

Embodiments of the present invention will now be described which provide an "intelligent" framework that involves co-operation between sensors and semi-autonomous actuators (but not necessarily among the sensors). The result is a climate control system capable of progressively identifying suitable pairings (through unsupervised machine learning) and implementing a self-defining policy capable of taking into account individual preferences (if specified).

A "semi-autonomous" device is one that can take into account the actions of other devices but which are ultimately making their own decisions independently (i.e. there is no subordination to a central controller or "master-slave" relationship between sensors/actuators).

FIG. 1 shows an outline of a building management system according to an embodiment of the present invention. For ease of description, the embodiments of the present invention will be described with reference to the situation in which the system is operating a collection of air-conditioning vents and the sensors are thermometers (i.e. any kind of temperature sensor). However, it will be understood that the same processes could also be used in other contexts (e.g. for heating, for managing air humidity etc.).

Sensors (S1-S5) are the simplest elements in the framework of this embodiment and only report their own measurements to the actuators (A1-A3). The sensors are devices capable of: measuring an environmental variable (e.g. temperature); recording a time-series over a short period (so as to be able to detect variations and extrema); and communicating (e.g. by sending a reading when certain conditions are met). The communication may be by way of a wireless network (as shown in FIG. 1) or by a wired network.

Actuators A1-A3 are part of the climate control appliances themselves (e.g. A/C vents V1-V3, but could be, for example, fans and/or chillers). They are devices capable of: listening to (a sub-set of) sensors within range; recording time-series for these sensors and performing statistical analysis of the data; communicating with each other (e.g. by notifying each other when they change state); processing information to choose which sensors to "listen to" and regulate their own operation. In the embodiment shown, each actuator A1-A3 controls a single vent V1-V3, but the same principles could readily be applied in a situation where an actuator, or other controller, controls more than one climate control device.

The sensors of this embodiment do only two things, apart from measuring an environmental variable: (1) they send their readings to actuators subscribed to their individual feed, and (2) when they detect that the first derivative (i.e. the difference between two readings) reaches a negative minimum (e.g. the temperature has reached its fastest drop rate), they broadcast an alert to all actuators within range (a "shout").

In one particular embodiment, individual preferences can be taken into account. In this embodiment, each sensor has an individual target value for the environmental variable that it is monitoring and communicates its readings in the form of the difference (positive or negative) between the measured and target values.

The actuators (and the climate control appliances) are more complex and are capable of learning about the effect they are having on various sensors. It is their information processing, decision-making and actions that underpin the self-configuration of the virtual BMS.

Figure 2:
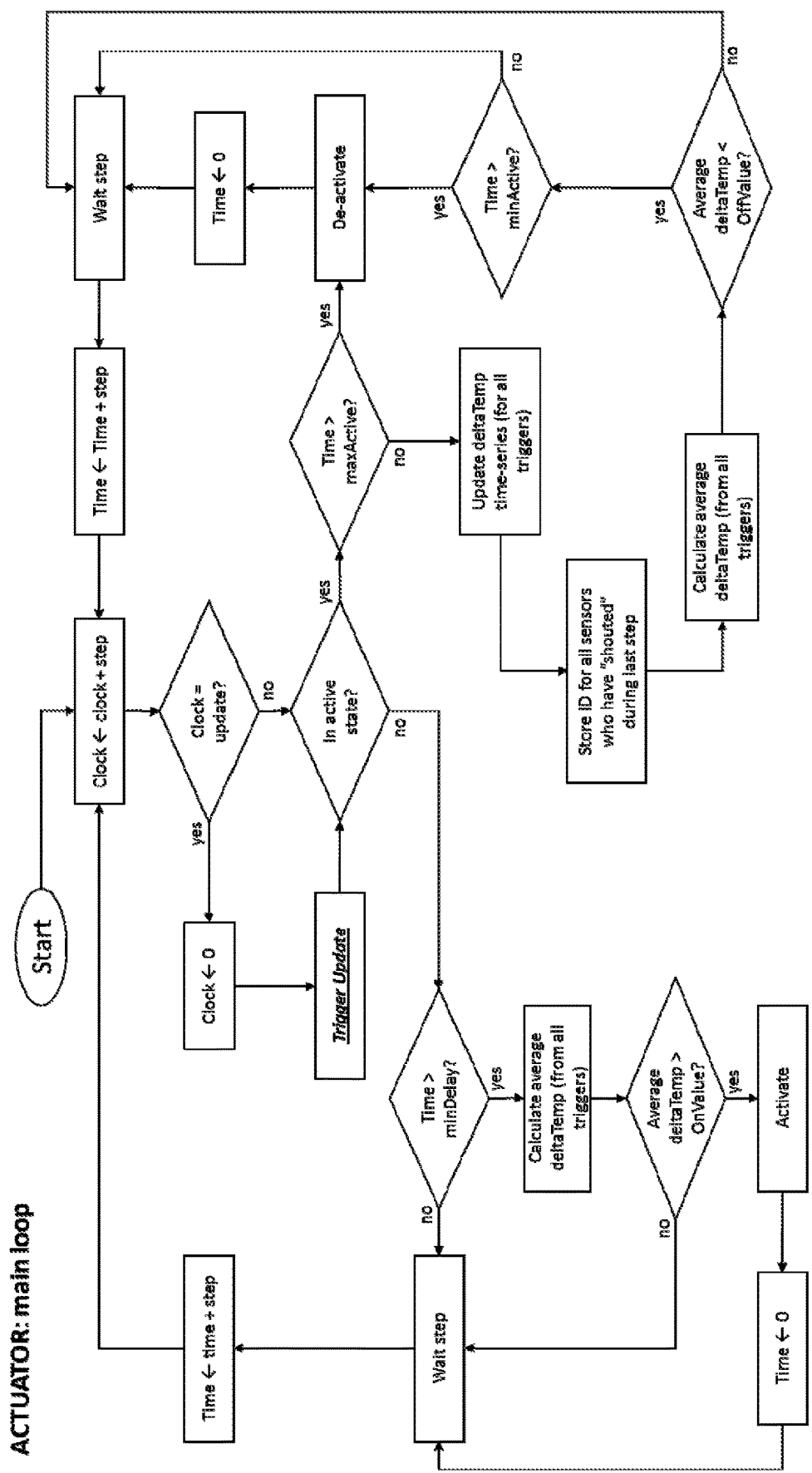
FIG. 2 is a flow chart showing the operation of the controller in a climate control device according to an embodiment of the present invention.

The flow process for an actuator according to an embodiment of the invention is set out in FIG. 2.

At deployment time, an actuator is subscribed to an arbitrarily chosen number of randomly selected sensors to "bootstrap" the learning process. It is also assigned target "activation" and "de-activation" temperatures. For instance it may be instructed to turn itself on when the difference between the measured and target temperature is +2 degrees, then off when it reaches −2 degrees. The difficulty that the actuator has at deployment is that it does not have direct access to useful, reliable information about actual temperature in its area of influence. It therefore has to infer this temperature from data transmitted by what could or could not be a suitable set of sensors. However, this is exactly the situation faced by any new actuator which is introduced to an existing system and the ability of the actuators to learn how to infer this temperature means that the system is completely scalable and does not require reconfiguration every time a new device is added.

When active/open, each vent monitors the values reported by all the sensors to which it is subscribed. At regular intervals (e.g. every second), each reading is paired with the time elapsed since the vent opened, then entered as a new data-point. At the end of a period of arbitrary duration, time series are analysed. If the vent opened more than once during the period, there will be more than one reading for each sensor and each time-stamp, making it possible to calculate the average and standard deviation. Note that since time-stamps are generated by the actuator (vent) relative to its own activation (opening), the same reading from one sensor could be associated with a different time-stamp in different time-series compiled by different actuators (if monitored by several).

The statistics obtained are used by the actuator to rank the sensors to which it was subscribed during the latest period.

As a first step, the list is sorted from the sensor associated with the lowest to the one associated with the highest value of composite variable alpha:

$$\overline{\delta T_i} = \frac{\sum_{j=1}^{n} \delta T_{i,j}}{n}$$

$$s_i = \sqrt{\frac{\sum_{j=1}^{n}(\delta T_{i,j} = \overline{\delta T_i})^2}{n-1}}$$

$$s'_i = \frac{s_i}{|\overline{\delta T_i}|}$$

$$\overline{s'} = \frac{\sum_{i=1}^{r} s'_i}{r}$$

$$\delta T_{min} = \min(\overline{\delta T_1}, \overline{\delta T_2}, \ldots, \overline{\delta T_r})$$

$$\alpha = \frac{\delta T_{min}}{\overline{s'}}$$

Where $\overline{\delta T_i}$ is the temperature variation between the reading at time i (since activation) and its predecessor, averaged over the n values recorded during the latest period, and $\overline{s'}$ is the weighted standard deviation averaged over all r elements of the time series.

Figure 3:
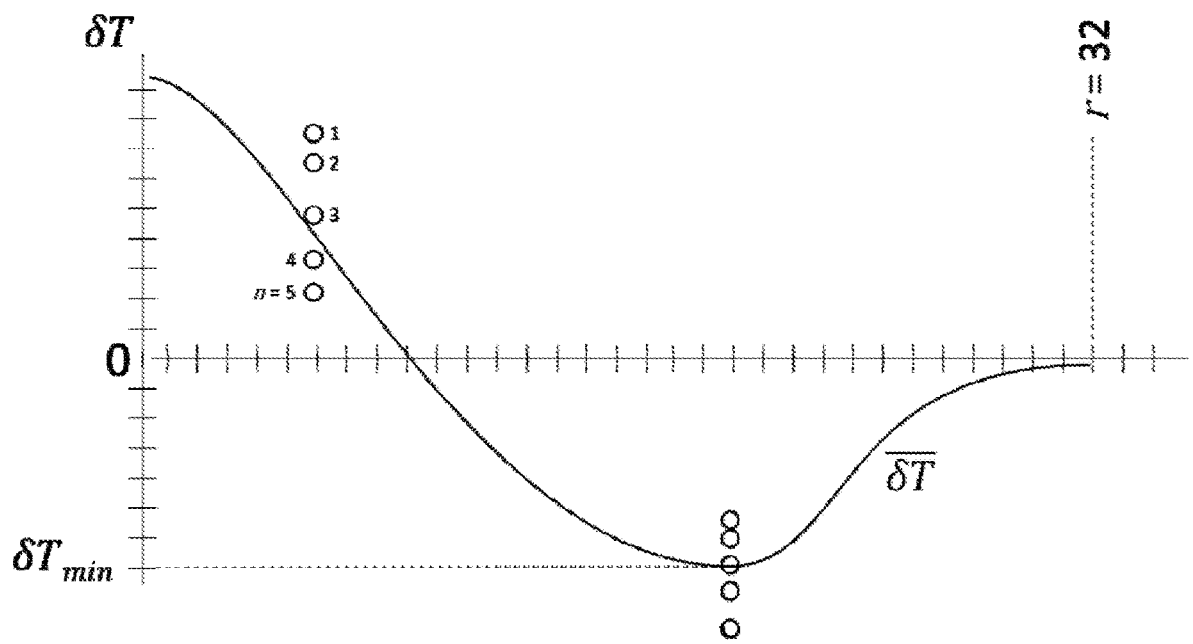
FIG. 3 shows an example of how the temperature detected by a sensor might vary over time in a case where the sensor is located somewhere in the area of influence of an air-conditioning unit but not immediately in front of it.

FIG. 3 shows an example of how the readings might vary over time in the case where the sensor is located somewhere in the area of influence of the air-conditioning unit but not immediately "in front". For a short period after the opening/activation, the temperature is still going up ($\delta T$ positive), because the effect is not felt yet. After a while, $ST$ turns negative, reflecting the influence of the cold air blown by the vent, before asymptotically returning to zero (indicating that temperature is approaching equilibrium when air-conditioning is on). In this example, the vent opened 5 times during the monitoring period (n=5 data points per time-stamp) and each time series is comprised of r=32 recordings (e.g., if the interval is 5 seconds, the vent was open for 5×32=2'40").

The composite variable alpha is designed so that the sensors on which the actuator has the strongest influence (lowest $\delta T_{min}$) come first in the list, unless the data is noisy (which would typically be reflected in higher $\overline{s'}$ values).

Once the sensors, or more precisely the time-series associated with them, have been ranked, a second criterion is applied to select a sub-set of sensors as triggers. This criterion is that the $\overline{\delta T}$ curve must cross the axis once from positive to negative (first derivative of $\overline{\delta T}$ lower than zero) but not from negative to positive, as this suggests that the air-conditioning unit does indeed have an influence on the sensor. On the contrary, if the temperature variation crosses into positive values while the air-conditioning vent is open, it indicates an adverse effect, which is contradictory. Note that the curve shown on FIG. 3 satisfies this criterion and is therefore a good trigger candidate. Only the sensors ranked above the first one not to satisfy this double criterion are used as triggers (which means they are also likely to have a comparatively low alpha value), unless none are eligible, in which case the first one in the list is designated as the sole trigger.

In the current simulated implementation, the difference between target and measured temperatures, averaged over all triggers, is used to command the activation and de-activation of the climate-control appliance, but it could of course be replaced by a "largest" or "smallest" deviation rule. Furthermore, there are "safeguards" in terms of the shortest and longest (in)activity period allowed. This prevents pathological situations in which the vent alternates too quickly between "open" and "closed" states or remains constantly stuck in one state. The former case can present itself when the actuator has only one trigger located very close to the vent. The latter can be observed when the "smart" appliance is triggered by a sensor over which it has no influence (which frequently happens in the early stages of the learning process, due to the random pairings used to bootstrap the system). Immediately after closing, a vent also draws a random number between zero and the total duration of its latest activity period. This value is used to determine the length of a "resting" period during which it does not restart, notwithstanding the state of its trigger(s).

The adaptation and learning procedure (followed independently by each actuator) is carried out in the following manner. Each actuator maintains a further list of sensors (a "candidate" list) which includes both the triggers which are currently being used for control information, and a number of non-trigger sensors. Sensors from the candidate list can be promoted to triggers by the selection process described above (and sensors "demoted" from trigger status may be retained in the candidate list (although they may also be discarded from consideration entirely, for example if their time series data shows a contradictory or adverse correlation with the operation of the actuator).

The candidate list may be populated in a number of ways, which are not necessarily exclusive and could operate in conjunction with each other. As mentioned earlier, each sensor is capable of detecting when it reaches a negative minimum in the temperature drop rate and, once it has reached this point, initiates a "shout" (broadcast notification message). Any actuator/appliance receiving this notification while active adds that sensor to the list of candidates. The rationale is that any active air-conditioning unit receiving such a message could be responsible for the sensor having reached a negative minimum in the temperature drop rate.

Other ways of populating the candidate list could be to include all sensors in the system (which may be practical for smaller systems, but is less likely to be efficient in a larger system). In other alternatives, the candidate list is populated with a defined subset of all the sensors in the system, perhaps based on those sensors which are within wireless communication range of the actuator, or which are within a defined spatial area compared to the actuator. Further, the candidate list may be randomly populated or re-populated at set intervals, for example by discarding candidates which have been in the list for greater than a predetermined period without being selected as triggers and replacing them with alternative candidate sensors.

In a further development actuators and/or sensors may be provided with a list of neighbouring actuators and, when a sensor is going to be dropped from the candidate list of one actuator, it could be automatically transferred to the candidate list of a neighbouring actuator.

Figure 4:
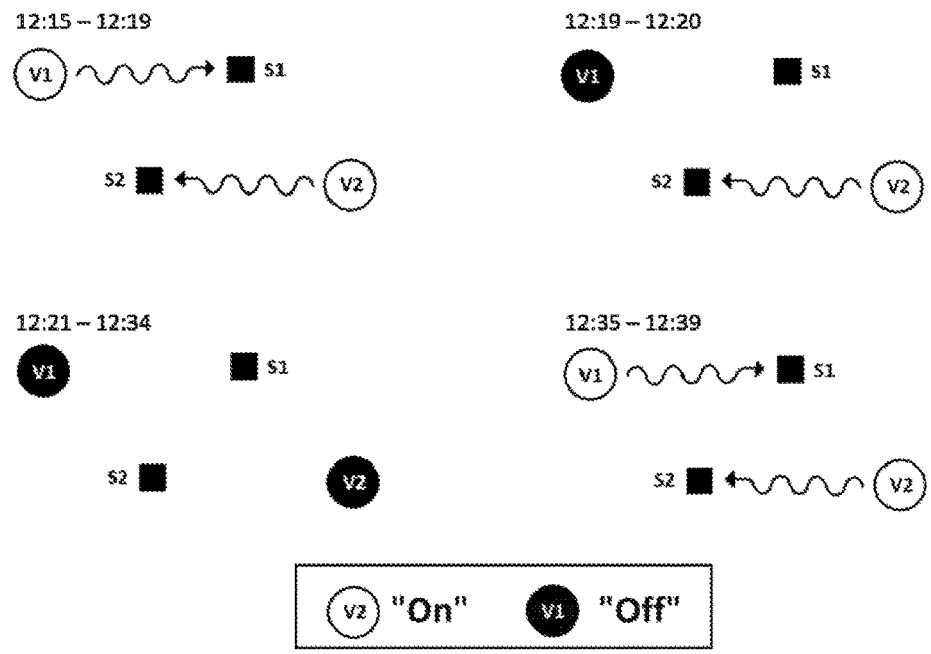
FIG. 4 shows an example of how false positive links between sensors and actuators may arise.

Finally, a disambiguation procedure is used to avoid one vent/actuator wrongly "believing" that it is having an influence on a given sensor. This can happen when the conditions previously described are met but only as a result of the fortuitous co-activation of another vent. In other words: vent V1 may wrongfully conclude that it is having an influence on sensor S2 (even though this is not the case) because V2 was also active every time that V1 was (see FIG. 4). Note that this type of synchronisation is not far-fetched, since the activity of all air-conditioning units within a certain area are effectively coupled through the influence of an external environmental factor (outside temperature).

In order to resolve this issue, a further embodiment of the present invention involves communication between actuators. Whenever a vent opens or closes, it broadcasts this change of state so as to inform all others within communication range. This is enough for every actuator to identify the one of its counterpart with which it has the longest activity overlap (note that this is not necessarily a symmetrical relationship). This information is then used during the course of the next learning period in the following way: every time that readings from trigger sensors would normally require its activation, the air-conditioning unit first checks whether its main "competitor" is already in action. If this is the case, the opening of the vent is temporarily cancelled. This method reduces overlap and, in doing so, can help identify "false positives" from the previous period (if any).

Figure 5:
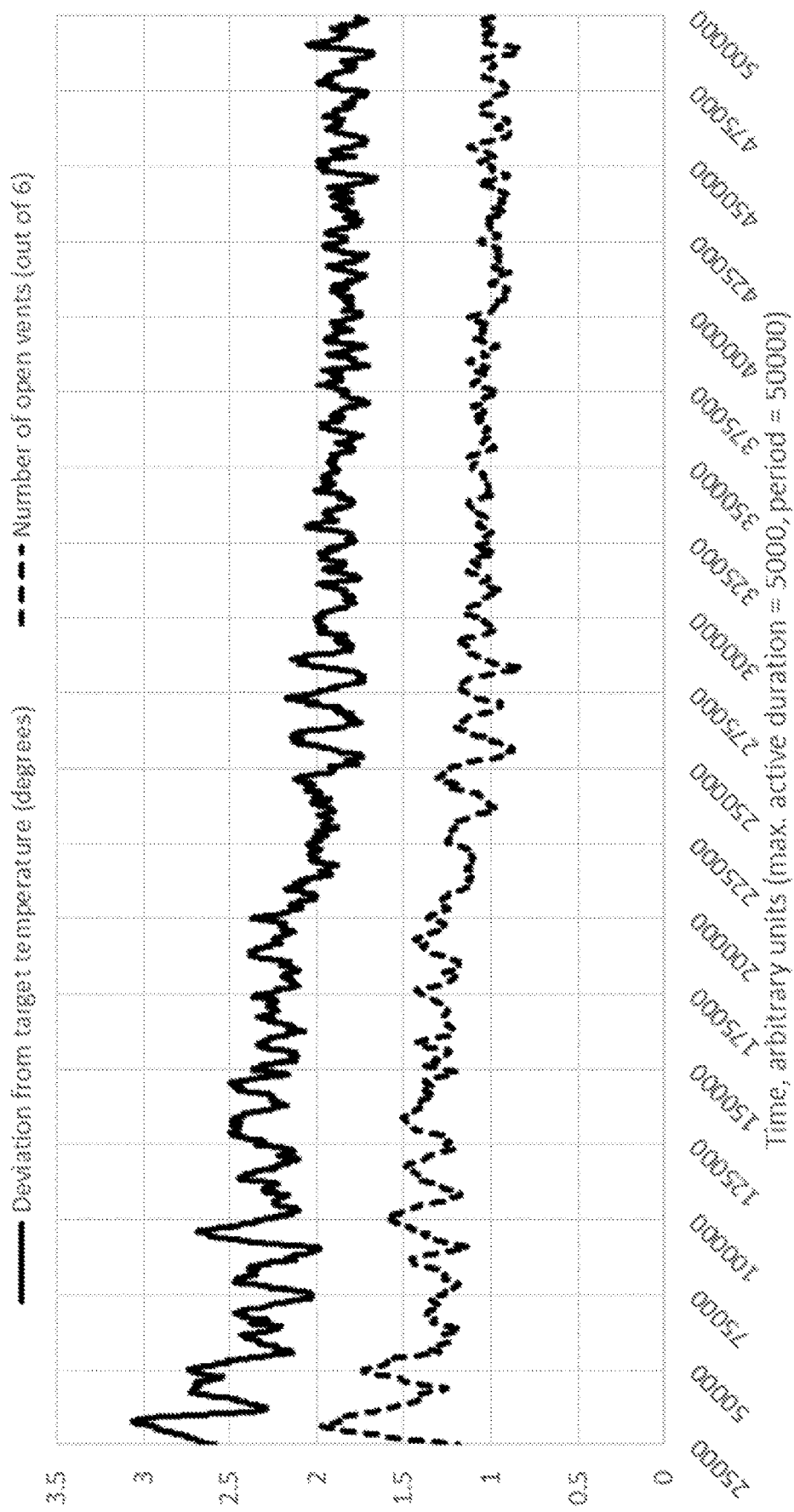
FIG. 5 shows simulations results which demonstrate how the average deviation from the target temperature and the average number of vents open at any one time both decrease during the course of the learning process according to an embodiment of the present invention.

Simulation-based testing indicates that, statistically, the method of the embodiment described is capable of limiting how far actual temperatures are allowed to drift away from target while simultaneously reducing the time that vents remain open (in other words and in first approximation: higher comfort levels for lower energy consumption). This is illustrated in FIG. 5, which shows how the average deviation from the target temperature and the average number of vents open at any one time both decrease during the course of the learning process. Note that not just absolute values but also, and perhaps more importantly, the amplitude of fluctuations are measurably reduced.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1] Farrokh Jazizadeh, Burcin Becerik-Gerber "Toward Adaptive Comfort Management in Office Buildings Using Participatory Sensing for End User Driven Control," 4th ACM Workshop On Embedded Sensing System for Energy-Efficiency in Buildings, Nov. 6, 2012, Toronto Canada
[2] Giancarlo Fortino and Antonio Guerrieri, "Decentralized and Embedded Management for Smart Buildings," in the Proceeding of The Workshop on Applications of Software Agents ISBN 978-86-7031-188-6, pp. 3-7, 2011
[3] Giancarlo Fortino, Antonio Guerrieri, "Monitoring building indoors through clustered embedded agents," in Computer Science and Information Systems (FedCSIS), 2011 Federated Conference on, vol., no., pp. 569-576, 18-21 Sep. 2011
[4] Building management system with fault analysis—US 20110178977 A1
[5] Smart building manager—U.S. Pat. No. 8,600,556 B2
[6] Building Management System—U.S. Pat. No. 7,567,844 B2

All references referred to above are hereby incorporated by reference.

The invention claimed is:

1. A method of controlling a climate control device whose operation affects a climate parameter, the method including the steps of:
   detecting the value of the climate parameter at a plurality of sensors remote from said climate control device;
   receiving the detected values from a plurality of said sensors at the climate control device;
   analyzing, at said climate control device, the received values and determining a subset of said sensors as being sensors which are influenced by the operation of the climate control device; and
   subsequently controlling the operation of the climate control device in accordance with further received values from said subset of sensors; and
   wherein the step of analyzing determines the subset of sensors as the sensors which are most influenced by the operation of the climate control device.

2. The method according to claim 1 further including the step of recording a time-series of values from said sensors over a predetermined time window, wherein the step of analyzing includes comparing said time-series to the operation of the climate control device in the same window.

3. The method according to claim 1 wherein the method further includes the step of receiving, at the climate control device, information from at least one other climate control device regarding its operation, and wherein the step of analyzing takes account of that information.

4. The method according to claim 1 wherein the step of analyzing orders the sensors from which detected values are received using the composite variable $\alpha$:

$$\alpha = \delta T_{min}/\overline{s}$$

wherein $\delta T_{min}$ and $\overline{s'}$ are calculated as follows, based on $\overline{\delta T_i}$ being the temperature variation between the reading at time i (since activation) and its predecessor, averaged over the n values recorded during the latest period, and $\overline{s'}$ is the weighted standard deviation averaged over all r elements of the time series:

$$\overline{\delta T_i} = \frac{\sum_{j=1}^{n} \delta T_{i,j}}{n}$$

$$s_i = \sqrt{\frac{\sum_{j=1}^{n} (\delta T_{i,j} = \overline{\delta T_i})^2}{n-1}}$$

$$s'_i = \frac{s_i}{|\overline{\delta T_i}|}$$

$$\overline{s'} = \frac{\sum_{i=1}^{r} s'_i}{r}$$

$$\delta T_{min} = \min(\overline{\delta T_1}, \overline{\delta T_2}, \ldots, \overline{\delta T_r})$$

and determines said subset as the sensors with the lower values of α amongst the sensors from which detected values are received.

5. The method according to claim 4 wherein the subset is determined as all sensors having a value of a below a predetermined level.

6. The method according to claim 4 wherein the subset is determined as a predetermined number of sensors having the lowest values of a.

7. The method according to claim 1 wherein the operation of the device causes the climate parameter in an area immediately surrounding the device to change in a first direction, the method further including the step of recording a time-series of data from each of said sensors over a predetermined time window during which the device is operational, and wherein the step of analysis includes the sub-steps of:
   determining, for each time-series, the change in each recorded value compared to the last recorded value from same sensor,
   determining, from said changes, the sensors whose changes in recorded values in said window change from being changes in a second direction, which is opposite to said first direction, to being changes in the first direction, and whose changes in recorded values in said window do not change from being changes in said first direction to changes in said second direction in said window; and
   selecting only said determined sensors in said subset.

8. The method according to claim 1 wherein at least one of the sensors has a predetermined target value for the climate parameter and the detected values from said sensor or sensors are in the form of differences between the measured and target values of the climate parameter at said sensor.

9. The method according to claim 1 wherein, when the climate control device is first switched on, its operation is initially controlled based on the detected values from an arbitrary subset of said sensors, until sufficient detected values have been received for said analysis step to be performed.

10. The method according to claim 1 wherein the step of controlling further causes the device to remain in an inactive state at least for a determined period after the device is caused to be inactive, regardless of said received values during said determined period.

11. The method according to claim 10 wherein the determined period is randomly selected as any duration between zero and the length of the previous activation of the device.

12. The method according to claim 1 wherein the climate control device maintains a list of sensors which are candidates for inclusion in said subset, wherein the plurality of sensors from which the detected values are received are the sensors on said list, and further including the steps of adding and/or removing sensors from said list based on determinations as to the potential relevance of the sensor to the operation of the climate control device.

13. The method according to claim 12 further including the step of, if the rate of change of the climate parameter detected by a sensor reaches a predetermined level, communicating the identity of that sensor to all climate control devices which are currently active, wherein the receipt of such a communication causes any climate control device which is currently active to add that sensor to its list of sensors.

14. The method according to claim 1 further including the steps of:
   communicating, between the climate control devices, whether each climate control device is active or not;
   for a first climate control device among said climate control devices, determining which of the other climate control devices has the greatest overlap in activity; and
   during the step of subsequently controlling, determining whether the other climate control device with the greatest overlap in activity is active or not, and, if said other climate control device is active, not activating said first climate control device for a predetermined period of time.

15. A climate control system, the system including:
   a climate control device whose operation affects a climate parameter, the climate control device having a controller; and
   a plurality of sensors configured to detect the value of the climate parameter,
   wherein the controller is configured to control the operation of the climate control device by:
      receiving the detected values from a plurality of said sensors;
      analyzing received values and determining a subset of said sensors as being sensors which are influenced by the operation of the climate control device; and
      subsequently controlling the operation of the climate control device in accordance with further received values from said subset of sensors, and
   wherein the controller is further configured to determine the subset of sensors as the sensors which are most influenced by the operation of the climate control device.

16. The system according to claim 15 wherein the sensor and/or the controller are configured to record a time-series of values from said sensors over a predetermined time window, and the controller is further configured to analyze the received values by comparing said time-series to the operation of the climate control device in the same window.

17. The system according to claim 15 wherein the controller is further configured to receive information from at least one other climate control device regarding its operation, and to take account of that information when analyzing the received values.

18. The system according to claim 15 wherein the controller is configured to analyze the received values by orders the sensors from which detected values are received using the composite variable α:

$$\alpha = \frac{\delta T_{min}}{\overline{s'}}$$

wherein $\delta T_{min}$ and $\overline{s'}$ are calculated as follows, based on $\overline{\delta T_i}$ being the temperature variation between the reading at time i (since activation) and its predecessor, averaged over the n values recorded during the latest period, and $\overline{s'}$ is the weighted standard deviation averaged over all r elements of the time series:

$$\overline{\delta T_i} = \frac{\sum_{j=1}^{n} \delta T_{i,j}}{n}$$

$$s_i = \sqrt{\frac{\sum_{j=1}^{n}(\delta T_{i,j} = \overline{\delta T_i})^2}{n-1}}$$

$$s'_i = \frac{s_i}{|\overline{\delta T_i}|}$$

$$\overline{s'} = \frac{\sum_{i=1}^{r} s'_i}{r}$$

$$\delta T_{min} = \min(\overline{\delta T_1}, \overline{\delta T_2}, \ldots, \overline{\delta T_r})$$

and to determine said subset as the sensors with the lower values of α amongst the sensors from which detected values are received.

19. The system according to claim 18 wherein the controller is configured to determine the subset as all sensors having a value of a below a predetermined level.

20. The system according to claim 18 wherein the controller is configured to determine the subset as a predetermined number of sensors having the lowest values of a.

21. The system according to claim 15, wherein the operation of the device causes the climate parameter in an area immediately surrounding the device to change in a first direction, and further wherein:
the controller is configured to record or receive a time-series of data from each of said sensors over a predetermined time window during which the device is operational, and wherein the controller is further configured to analyze the received values by:
determining, for each time-series, the change in each recorded value compared to the last recorded value from same sensor,
determining, from said changes, the sensors whose changes in recorded values in said window change from being changes in a second direction, which is opposite to said first direction, to being changes in the first direction, and whose changes in recorded values in said window do not change from being changes in said first direction to changes in said second direction in said window; and selecting only said determined sensors in said subset.

22. The system according to claim 15 wherein at least one of the sensors has a predetermined target value for the climate parameter and the detected values from said sensor or sensors are in the form of differences between the measured and target values of the climate parameter at said sensor.

23. The system according to claim 15 wherein the controller is configured such that, when climate control device is first switched on, its operation is initially controlled based on the detected values from an arbitrary subset of said sensors, until sufficient detected values have been received for said analysis step to be performed.

24. The system according to claim 15 wherein the controller is configured to cause the device to remain in an inactive state at least for a determined period after the device is caused to be inactive, regardless of said received values during said determined period.

25. The system according to claim 24 wherein the determined period is randomly selected as any duration between zero and the length of the previous activation of the device.

26. The system according to claim 15 wherein:
there are a plurality of climate control device and each climate control device is configured to communicate to other climate control devices, whether said climate control device is active or not;
the controller of a first climate control device among said climate control devices is configured to:
determine which of the other climate control devices has the greatest overlap in activity with said first climate control device; and
when subsequently controlling the operation of the first climate control device, determine whether the other climate control device with the greatest overlap in activity is active or not, and, if said other climate control device is active, not activate said first climate control device for a predetermined period of time.

27. A climate control system, the system including:
a climate control device whose operation affects a climate parameter, the climate control devices having a controller; and
a plurality of sensors configured to detect the value of the climate parameter,
wherein the controller is configured to control the operation of the climate control device by:
receiving the detected values from a plurality of said sensors,
analyzing the received values and determining a subset of said sensors are being sensors which are influenced by the operation of the climate control device; and
subsequently controlling the operation of the climate control device in accordance with further received values from said subset of sensors; and
wherein the controller is configured to maintain a list of sensors which are candidates for inclusion in said subset, wherein the plurality of sensors from which the detected values are received are the sensors on said list, and wherein the controller is further configured to add and/or remove sensors from said list based on determinations as to the potential relevance of the sensor to the operation of the climate control device.

28. The system according to claim 27 wherein the sensors are configured to, if the rate of change of the climate parameter detected by a sensor reaches a predetermined level, communicate the identity of that sensor to all climate control devices which are currently active and wherein the controller is further configured to, on receipt of such a communication, if said climate control device is currently active, add that sensor to its list of sensors.

* * * * *